(12) United States Patent
Wang et al.

(10) Patent No.: US 11,211,970 B2
(45) Date of Patent: Dec. 28, 2021

(54) COMMUNICATION METHOD AND CORRESPONDING USER TERMINAL, AND BASE STATION

(71) Applicant: NTT DOCOMO, INC., Tokyo (JP)

(72) Inventors: Runxin Wang, Beijing (CN); Wenjia Liu, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/734,949

(22) PCT Filed: Jul. 16, 2018

(86) PCT No.: PCT/CN2018/095844
§ 371 (c)(1),
(2) Date: Dec. 3, 2020

(87) PCT Pub. No.: WO2020/014843
PCT Pub. Date: Jan. 23, 2020

(65) Prior Publication Data
US 2021/0234571 A1    Jul. 29, 2021

(51) Int. Cl.
*H04B 1/707* (2011.01)
(52) U.S. Cl.
CPC ................................ *H04B 1/707* (2013.01)
(58) Field of Classification Search
CPC ..................................................... H04B 1/707
See application file for complete search history.

(56) References Cited

U.S. PATENT DOCUMENTS

| 10,917,117 B2 | 2/2021 | Yu |
| 2017/0013507 A1 | 1/2017 | Lee et al. |
| 2019/0124681 A1* | 4/2019 | Lee ........................ H04L 1/0003 |

FOREIGN PATENT DOCUMENTS

| CN | 103227819 A | 7/2013 |
| CN | 108123776 A | 6/2018 |
| EP | 1227626 A2 | 7/2002 |

OTHER PUBLICATIONS

International Search Report for corresponding International Application No. PCT/CN2018/095844, dated Apr. 9, 2019 (5 pages).
Written Opinion for corresponding International Application No. PCT/CN2018/095844, dated Apr. 9, 2019 (6 pages).
International Preliminary Report on Patentability for corresponding International Application No. PCT/CN2018/095844, dated Jan. 19, 2021 (4 pages).

* cited by examiner

*Primary Examiner* — Kabir A Timory
(74) *Attorney, Agent, or Firm* — Osha Bergman Watanabe & Burton LLP

(57) ABSTRACT

The present disclosure provides a communication method and a corresponding user terminal, and a base station. The communication method performed by the user terminal includes receiving information about modulation and coding from the base station; and determining a spreading parameter for the user terminal according to the information about modulation and coding, wherein the spreading parameter is used for the user terminal to spread symbols.

11 Claims, 3 Drawing Sheets

COMMUNICATION METHOD AND CORRESPONDING USER TERMINAL, AND BASE STATION

TECHNICAL FIELD

The present disclosure relates to a field of mobile communication, and in particular to a communication method and a corresponding user terminal, a base station.

BACKGROUND

In order to improve anti-interference performance of a communication system, it has been proposed to use a spreading factor to spread symbols in a Non-Orthogonal Multiple Access (NOMA) system. In a NOMA system, a user terminal may encode and modulate data bits to obtain symbols, and then spread the symbols by using a spreading factor, perform processing such as interleaving, scrambling, power allocating or resource allocating for the spread symbols, and finally transmit processed signals on wireless resources.

In the prior art, a base station may transmit the spreading factor for the user terminal as a part of control signaling to the user terminal, so that the user terminal may spread symbols according to the received spreading factor. However, in this way, the transmission of the spreading factor will cause additional signaling overhead and waste wireless transmission resources. Therefore, a method to reduce signaling overhead is needed to transmit the spreading factor.

SUMMARY OF THE DISCLOSURE

According to one embodiment of the present disclosure, a communication method performed by a user terminal is provided. The method comprises: receiving information about modulation and coding from a base station; and determining a spreading parameter for the user terminal according to the information about modulation and coding, wherein the spreading parameter is used for the user terminal to spread symbols.

According to another embodiment of the present disclosure, a communication method performed by a base station is provided. The method comprises: determining information about modulation and coding for a user terminal; and transmitting the information about modulation and coding to the user terminal, so that the user terminal determines a spreading parameter according to the information about modulation and coding, wherein the spreading parameter is used for the user terminal to spread symbols.

According to another embodiment of the present disclosure, a user terminal is provided, comprising: a receiving unit configured to receive information about modulation and coding from a base station; and a determining unit configured to determine a spreading parameter for the user terminal according to the information about modulation and coding, wherein the spreading parameter is used for the user terminal to spread symbols.

According to another embodiment of the present disclosure, a base station is provided, comprising: a determining unit configured to determine information about modulation and coding for a user terminal; and a transmitting unit configured to transmit the information about modulation and coding to the user terminal, so that the user terminal determines a spreading parameter according to the information about modulation and coding, wherein the spreading parameter is used for the user terminal to spread symbols.

BRIEF DESCRIPTION OF THE DRAWINGS

The above and other objectives, features and advantages of the present disclosure will become clearer by describing embodiments of the present disclosure in details in conjunction with accompanying drawings. The accompanying drawings are used to provide a further understanding of the embodiments of the present disclosure, constitute a part of this specification, and explain the present disclosure together with the embodiments of the present disclosure, but do not constitute a limitation on the present disclosure. In the accompanying drawings, like reference numerals usually represent like components or steps.

DESCRIPTION OF THE EMBODIMENTS

In order to make objectives, technical solutions and advantages of the present disclosure clearer, exemplary embodiments according to the present disclosure will be described in detail below with reference to the accompanying drawings.

Figure 1:
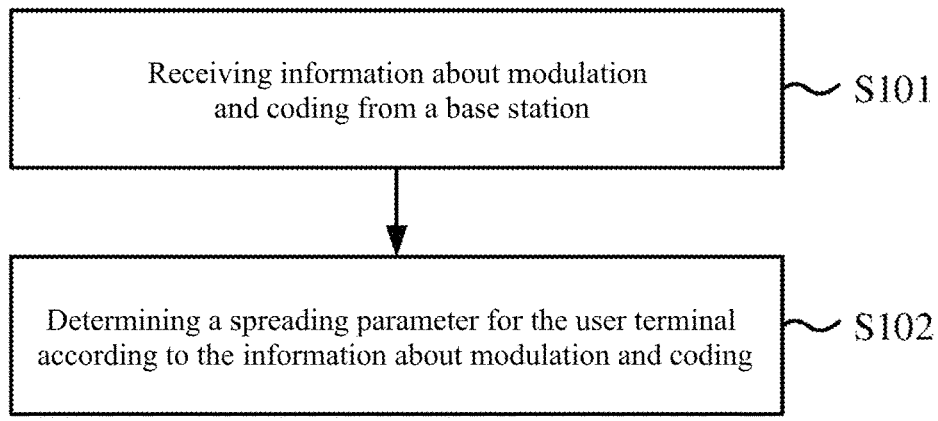
FIG. 1 is a flowchart of a communication method performed by a user terminal according to an embodiment of the present disclosure.

First, a method for determining a spreading parameter by a user terminal according to information about modulation and coding will be described with reference to FIG. 1. FIG. 1 is a flowchart of a communication method 100 performed by a user terminal according to an embodiment of the present disclosure. Since modulation, coding, and spreading all belong to data processing operations in communication, information about modulation and coding may be used to indicate a spreading parameter for the user terminal, without the need of transmitting the spreading parameter as a part of control signaling to the user terminal, thereby reducing signaling overhead and saving wireless resources.

As shown in FIG. 1, in step S101, the user terminal receives information about modulation and coding from a base station. The information about modulation may include modulation parameters that can be used by the user terminal, for example, a modulation order, a modulation mode or the like. The information about coding may include coding parameters that can be used by the user terminal, for example, a coding rate, a target coding rate or the like. The information about modulation and coding may be information used to indicate modulation and coding, for example, index information for a Modulation and Coding Scheme (MCS).

According to one example of the present disclosure, a value of an MCS index may be a natural number, such as a natural number greater than or equal to 0 and less than or equal to 31. It should be appreciated that the value of the MCS index is not limited to a natural number, and may also be a positive integer, such as a positive integer greater than or equal to 1 and less than or equal to 32.

Then, in step S102, the user terminal determines a spreading parameter for the user terminal according to the information about modulation and coding, where the spreading parameter is used for the user terminal to spread symbols. By spreading the symbols, a single symbol may be spread into one or more identical symbols, which enhances an anti-interference ability of the user terminal.

According to one example of the present disclosure, the spreading parameter in step S102 may be a spreading factor. For example, a value of the spreading parameter may be 1, 2, or 4. It should be appreciated that the value of the spreading parameter is not limited to 1, 2 or 4, and may also be other positive integers.

According to another example of the present disclosure, the user terminal may determine a modulation parameter and a coding parameter for the user terminal according to the information about modulation and coding. For example, the user terminal may receive the index information for MCS from the base station to determine an available modulation parameter and coding parameter, instead of receiving information for a specific modulation parameter and coding parameter from the base station. For example, the user terminal and the base station may pre-negotiate a plurality of MCS indexes and a modulation parameter and a coding parameter corresponding to each MCS index. In this case, the user terminal may determine the modulation parameter and the coding parameter corresponding to the MCS index according to the MCS index information received from the base station.

According to another example of the present disclosure, the user terminal may also determine spectral efficiency for the user terminal according to the information about modulation and coding. For example, the user terminal may receive the index information for MCS from the base station to determine the spectral efficiency, instead of acquiring a specific value of the spectral efficiency from the base station.

With the above examples of the present disclosure, the user terminal may determine the modulation parameter, the coding parameter, the spreading parameter, and the spectral efficiency for the user terminal according to the information about modulation and coding received from the base station, so that the user terminal may encode and modulate data bits by using the modulation parameter and the coding parameter to obtain symbols, spread the symbols by using the spreading parameter, and at the same time acquire the corresponding spectral efficiency in the case where the modulation parameter, the coding parameter, and the spreading parameter are used.

How the user terminal determines the spreading parameter for the user terminal according to the information about modulation and coding in step S102 will be described below. According to one example of the present disclosure, in step S102, the user terminal may determine the spreading parameter for the user terminal according to an index of the modulation and coding scheme and a first table, the first table including a plurality of indexes and spreading parameters corresponding to respective indexes.

According to one example of the present disclosure, in addition to the plurality of indexes and spreading parameters corresponding to respective indexes, the first table may further include one or more of a modulation parameter, a coding parameter, and spectral efficiency corresponding to each index. For example, the spectral efficiency for the user terminal may be determined according to the modulation parameter, the coding parameter, and the spreading parameter for the user terminal. For example, the spectral efficiency of the present disclosure may be calculated according to the modulation parameter, the coding parameter, and the spreading parameter for the user terminal in a conventional way of calculating spectral efficiency.

In the present disclosure, the user terminal may store a first table including only a plurality of indexes and spreading parameters corresponding to respective indexes. Alternatively, the user terminal may also store a first table that includes a plurality of indexes and spreading parameters corresponding to respective indexes, and further includes one or more of a modulation parameter, a coding parameter, and spectral efficiency corresponding to each index.

Figure 2:
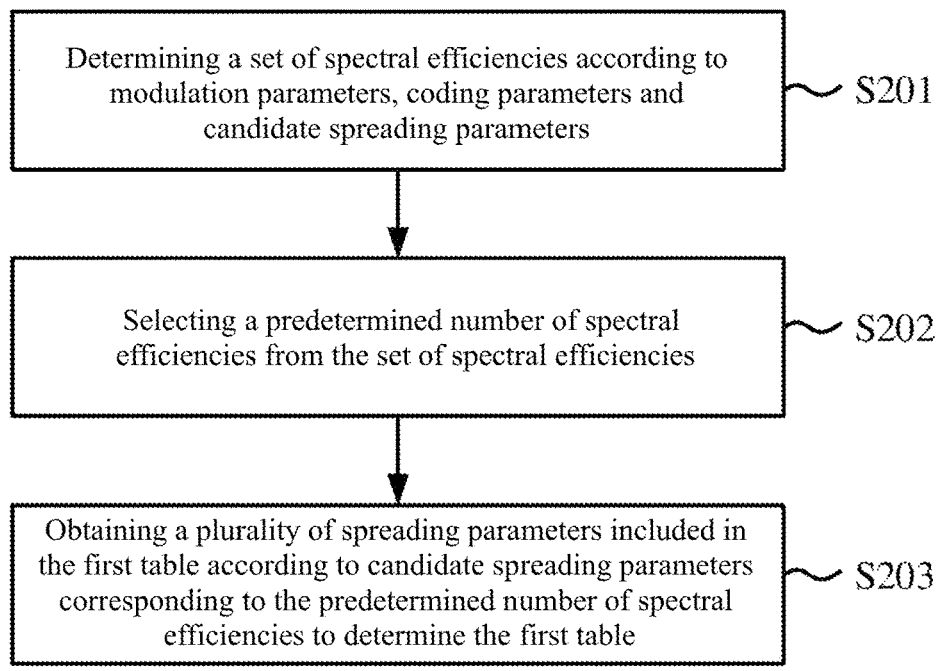
FIG. 2 is a flowchart of a method for determining a first table according to modulation parameters, coding parameters, and candidate spreading parameters according to an embodiment of the present disclosure.

In addition, according to one example of the present disclosure, the first table may be determined according to modulation parameters, coding parameters, and candidate spreading parameters. The method for determining the first table according to modulation parameters, coding parameters, and candidate spreading parameters will be described below with reference to FIG. 2. FIG. 2 is a flowchart of a method 200 for determining the first table according to modulation parameters, coding parameters, and candidate spreading parameters according to an embodiment of the present disclosure.

As shown in FIG. 2, in step S201, a set of spectral efficiencies is determined according to modulation parameters, coding parameters, and candidate spreading parameters. For example, the modulation parameters and the coding parameters in step S201 may be M candidate modulation parameters and candidate coding parameters, and the candidate spreading parameters in step S201 may be N candidate spreading parameters, where M and N are both positive integers. Since there are M possibilities for the modulation parameters and the coding parameters, and N possibilities for the candidate spreading parameters, the set of spectral efficiencies may include M×N elements.

Then, in step S201, a predetermined number of spectral efficiencies may be selected from the set of spectral efficiencies. In the present disclosure, the predetermined number may be represented by K, and K is a positive integer. For example, the user terminal may select the smallest or relatively small spectral efficiencies corresponding to the predetermined number from the set of spectral efficiencies, so that the user terminal suffers less interference in the scenario of small data packet transmission, which improves communication quality of the user terminal. An example in which the user terminal selects the smallest and relatively small spectral efficiencies corresponding to the predetermined number from the set of spectral efficiencies will be described in details below.

According to one example of the present disclosure, the smallest spectral efficiencies corresponding to the predetermined number may be selected from the set of spectral efficiencies. For example, in step S201, elements (i.e., spectral efficiencies) in the set of spectral efficiencies may be sorted in ascending order, and then the smallest spectral efficiencies corresponding to the predetermined number may be selected from the plurality of sorted spectral efficiencies. For example, firstly, M×N spectral efficiencies may be sorted in ascending order to obtain the sorted M×N spectral efficiencies, and then the top K spectral efficiencies may be selected from the sorted M×N spectral efficiencies as the predetermined number of spectral efficiencies. That is, the 1st, . . . , i-th, . . . , K-th spectral efficiencies of the sorted M×N spectral efficiencies are selected as the predetermined number of spectral efficiencies, where 1≤i≤K and i is a positive integer.

It should be appreciated that although the plurality of spectral efficiencies are sorted in ascending order in the above example, the present disclosure is not limited thereto. According to another example of the present disclosure, the plurality of spectral efficiencies may also be sorted in descending order, and then the smallest spectral efficiencies corresponding to the predetermined number may be selected from the plurality of sorted spectral efficiencies. For example, firstly, M×N spectral efficiencies may be sorted in descending order to obtain the sorted M×N spectral efficiencies, and then the last K spectral efficiencies may be selected from the sorted M×N spectral efficiencies as the predetermined number of spectral efficiencies. That is, the (M×N−K+1)-th, (M×N−K+2)-th, i-th, (M×N−1)-th, (M×N)-th spectral efficiencies of the sorted M×N spectral efficiencies are selected as the predetermined number of spectral efficiencies, where (M×N−K+1)≤i≤(M×N) and i is a positive integer.

The above example describes selecting the smallest spectral efficiencies corresponding to the predetermined number from the set of spectral efficiencies, but the present disclosure is not limited thereto. According to another example of the present disclosure, the predetermined number of relatively small spectral efficiencies may be selected from the set of spectral efficiencies. For example, in step S201, firstly, elements (i.e., spectral efficiencies) in the set of spectral efficiencies may be sorted in ascending order, and then relatively small spectral efficiencies corresponding to the predetermined number may be selected from the set of spectral efficiencies at a predetermined interval. In the present disclosure, the predetermined interval may be a positive integer. Two examples in which the predetermined interval is 1 are given below.

For example, firstly, M×N spectral efficiencies may be sorted in ascending order to obtain the sorted M×N spectral efficiencies, and then the 1st, 3rd, . . . , i-th, . . . , (2K−1)-th spectral efficiencies are selected from the sorted M×N spectral efficiencies as the predetermined number of spectral efficiencies, where 1≤i≤(2K−1) and i is an odd number.

For another example, firstly, M×N spectral efficiencies may be sorted in descending order to obtain the sorted M×N spectral efficiencies, and then the 2nd, 4th, . . . , i-th, . . . , (2K)-th spectral efficiencies are selected from the sorted M×N spectral efficiencies as the predetermined number of spectral efficiencies, where 2≤i≤(2K) and i is an even number.

It should be appreciated that although the plurality of spectral efficiencies are sorted in ascending order in the above example, the present disclosure is not limited thereto. According to another example of the present disclosure, the plurality of spectral efficiencies may also be sorted in descending order, and then relatively small spectral efficiencies corresponding to the predetermined number may be selected from the set of spectral efficiencies at a predetermined interval.

Then, in step S203, a plurality of spreading parameters included in the first table may be obtained according to candidate spreading parameters corresponding to the predetermined number of spectral efficiencies, to determine the first table. For example, MCS indexes corresponding to the predetermined number of spectral efficiencies may be renumbered to obtain a plurality of indexes included in the first table; and the candidate spreading parameters corresponding to the predetermined number of spectral efficiencies may be determined as the plurality of spreading parameters included in the first table.

The above method 200 will be described again below in conjunction with Tables 1-6 and taking M=32, N=3, and K=29 as an example. For example, in step S201, a set of spectral efficiencies including 87 spectral efficiencies is determined according to 32 modulation orders and coding parameters, and 3 candidate spreading parameters. In step S202, 29 spectral efficiencies may be selected from the set of spectral efficiencies. In step S203, a plurality of spreading parameters included in the first table may be determined according to candidate spreading parameters corresponding to the 29 spectral efficiencies, to determine the first table.

Table 1 below shows an example of the set of spectral efficiencies obtained by step S201. Elements in the set of spectral efficiencies may be spectral efficiencies listed in the spectral efficiency column in Table 1. As shown in Table 1, an MCS index may be represented by $I_{MCS}$, and its value may be a natural number from 0 to 31; a modulation order corresponding to each MCS index may be represented by $Q_m$; and a coding rate corresponding to each MCS index may be represented by R. In Table 1, the coding rate R may be a value obtained by quantizing an actual coding rate r, for example, a value obtained by multiplying the actual coding rate r by 1024. In addition, in Table 1, a value of the spreading factor may be 1, 2 or 4. For a given MCS index, modulation order, and coding rate, when the value of the spreading factor is 1, 2 and 4, respectively, three different spectral efficiencies may be generated.

TABLE 1

Example of the set of spectral efficiencies

| MCS Index $I_{MCS}$ | Modulation Order $Q_m$ | Coding Rate R r × [1024] | Spreading Factor | Spectral Efficiency |
|---|---|---|---|---|
| 0 | 2 | 120 | 1 | 0.2344 |
| 0 | 2 | 120 | 2 | 0.1172 |
| 0 | 2 | 120 | 4 | 0.0586 |
| 1 | 2 | 157 | 1 | 0.3066 |
| 1 | 2 | 157 | 2 | 0.1533 |
| 1 | 2 | 157 | 4 | 0.0767 |
| 2 | 2 | 193 | 1 | 0.3770 |
| 2 | 2 | 193 | 2 | 0.1885 |
| 2 | 2 | 193 | 4 | 0.0942 |
| 3 | 2 | 251 | 1 | 0.4902 |
| 3 | 2 | 251 | 2 | 0.2451 |
| 3 | 2 | 251 | 4 | 0.1226 |
| 4 | 2 | 308 | 1 | 0.6016 |
| 4 | 2 | 308 | 2 | 0.3008 |
| 4 | 2 | 308 | 4 | 0.1504 |
| 5 | 2 | 379 | 1 | 0.7402 |
| 5 | 2 | 379 | 2 | 0.3701 |
| 5 | 2 | 379 | 4 | 0.1851 |
| 6 | 2 | 449 | 1 | 0.8770 |
| 6 | 2 | 449 | 2 | 0.4385 |
| 6 | 2 | 449 | 4 | 0.2192 |
| 7 | 2 | 526 | 1 | 1.0273 |
| 7 | 2 | 526 | 2 | 0.5137 |
| 7 | 2 | 526 | 4 | 0.2568 |
| 8 | 2 | 602 | 1 | 1.1758 |
| 8 | 2 | 602 | 2 | 0.5879 |
| 8 | 2 | 602 | 4 | 0.2939 |
| 9 | 2 | 679 | 1 | 1.3262 |
| 9 | 2 | 679 | 2 | 0.6631 |
| 9 | 2 | 679 | 4 | 0.3315 |
| 10 | 4 | 340 | 1 | 1.3281 |
| 10 | 4 | 340 | 2 | 0.6641 |
| 10 | 4 | 340 | 4 | 0.3320 |
| 11 | 4 | 378 | 1 | 1.4766 |
| 11 | 4 | 378 | 2 | 0.7383 |

TABLE 1-continued

Example of the set of spectral efficiencies

| MCS Index $I_{MCS}$ | Modulation Order $Q_m$ | Coding Rate R r × [1024] | Spreading Factor | Spectral Efficiency |
|---|---|---|---|---|
| 11 | 4 | 378 | 4 | 0.3691 |
| 12 | 4 | 434 | 1 | 1.6953 |
| 12 | 4 | 434 | 2 | 0.8477 |
| 12 | 4 | 434 | 4 | 0.4238 |
| 13 | 4 | 490 | 1 | 1.9141 |
| 13 | 4 | 490 | 2 | 0.9570 |
| 13 | 4 | 490 | 4 | 0.4785 |
| 14 | 4 | 553 | 1 | 2.1602 |
| 14 | 4 | 553 | 2 | 1.0801 |
| 14 | 4 | 553 | 4 | 0.5400 |
| 15 | 4 | 616 | 1 | 2.4063 |
| 15 | 4 | 616 | 2 | 1.2031 |
| 15 | 4 | 616 | 4 | 0.6016 |
| 16 | 4 | 658 | 1 | 2.5703 |
| 16 | 4 | 658 | 2 | 1.2852 |
| 16 | 4 | 658 | 4 | 0.6426 |
| 17 | 6 | 438 | 1 | 2.5664 |
| 17 | 6 | 438 | 2 | 1.2832 |
| 17 | 6 | 438 | 4 | 0.6416 |
| 18 | 6 | 466 | 1 | 2.7305 |
| 18 | 6 | 466 | 2 | 1.3652 |
| 18 | 6 | 466 | 4 | 0.6826 |
| 19 | 6 | 517 | 1 | 3.0293 |
| 19 | 6 | 517 | 2 | 1.5146 |
| 19 | 6 | 517 | 4 | 0.7573 |
| 20 | 6 | 567 | 1 | 3.3223 |
| 20 | 6 | 567 | 2 | 1.6611 |
| 20 | 6 | 567 | 4 | 0.8306 |
| 21 | 6 | 616 | 1 | 3.6094 |
| 21 | 6 | 616 | 2 | 1.8047 |
| 21 | 6 | 616 | 4 | 0.9023 |
| 22 | 6 | 666 | 1 | 3.9023 |
| 22 | 6 | 666 | 2 | 1.9512 |
| 22 | 6 | 666 | 4 | 0.9756 |
| 23 | 6 | 719 | 1 | 4.2129 |
| 23 | 6 | 719 | 2 | 2.1064 |
| 23 | 6 | 719 | 4 | 1.0532 |
| 24 | 6 | 772 | 1 | 4.5234 |
| 24 | 6 | 772 | 2 | 2.2617 |
| 24 | 6 | 772 | 4 | 1.1309 |
| 25 | 6 | 822 | 1 | 4.8164 |
| 25 | 6 | 822 | 2 | 2.4082 |
| 25 | 6 | 822 | 4 | 1.2041 |
| 26 | 6 | 873 | 1 | 5.1152 |
| 26 | 6 | 873 | 2 | 2.5576 |
| 26 | 6 | 873 | 4 | 1.2788 |
| 27 | 6 | 910 | 1 | 5.3320 |
| 27 | 6 | 910 | 2 | 2.6660 |
| 27 | 6 | 910 | 4 | 1.3330 |
| 28 | 6 | 948 | 1 | 5.5547 |
| 28 | 6 | 948 | 2 | 2.7773 |
| 28 | 6 | 948 | 4 | 1.3887 |
| 29 | 2 | Reserved | 1 | |
| 29 | 2 | Reserved | 2 | |
| 29 | 2 | Reserved | 4 | |
| 30 | 4 | Reserved | 1 | |
| 30 | 4 | Reserved | 2 | |
| 30 | 4 | Reserved | 4 | |
| 31 | 6 | Reserved | 1 | |
| 31 | 6 | Reserved | 2 | |
| 31 | 6 | Reserved | 4 | |

Table 2 below shows an example of the 29 smallest spectral efficiencies obtained by step 202. The 29 spectral efficiencies in Table 2 are the 1st, 2nd . . . and 29th spectral efficiencies selected from 87 spectral efficiencies after sorting the 87 spectral efficiencies in ascending order. For example, after selecting the smallest 29 spectral efficiencies from the 87 spectral efficiencies, the smallest 29 spectral efficiencies may be filled in the spectral efficiency column (that is, the fifth column) in ascending order, and then MCS indexes and spreading factors corresponding to the 29 spectral efficiencies are filled in the MCS index column (that is, the first column) and the spreading factor column (the fourth column) respectively. At the same time, modulation orders and coding rates corresponding to the MCS indexes may also be filled in the modulation order column (that is, the second column) and the coding rate column (that is, the third column), respectively. In this way, the following Table 2 is determined.

TABLE 2

Example of the selected spectral efficiencies

| MCS Index $I_{MCS}$ | Modulation Order $Q_m$ | Coding Rate R r × [1024] | Spreading Factor | Spectral Efficiency |
|---|---|---|---|---|
| 0 | 2 | 120 | 4 | 0.0586 |
| 1 | 2 | 157 | 4 | 0.0767 |
| 2 | 2 | 193 | 4 | 0.0942 |
| 0 | 2 | 120 | 2 | 0.1172 |
| 3 | 2 | 251 | 4 | 0.1226 |
| 4 | 2 | 308 | 4 | 0.1504 |
| 1 | 2 | 157 | 2 | 0.1533 |
| 5 | 2 | 379 | 4 | 0.1851 |
| 2 | 2 | 193 | 2 | 0.1885 |
| 6 | 2 | 449 | 4 | 0.2192 |
| 0 | 2 | 120 | 1 | 0.2344 |
| 3 | 2 | 251 | 2 | 0.2451 |
| 7 | 2 | 526 | 4 | 0.2568 |
| 8 | 2 | 602 | 4 | 0.2939 |
| 4 | 2 | 308 | 2 | 0.3008 |
| 1 | 2 | 157 | 1 | 0.3066 |
| 9 | 2 | 679 | 4 | 0.3315 |
| 10 | 4 | 340 | 4 | 0.3320 |
| 11 | 4 | 378 | 4 | 0.3691 |
| 5 | 2 | 379 | 2 | 0.3701 |
| 2 | 2 | 193 | 1 | 0.3770 |
| 12 | 4 | 434 | 4 | 0.4238 |
| 6 | 2 | 449 | 2 | 0.4385 |
| 13 | 4 | 490 | 4 | 0.4785 |
| 3 | 2 | 251 | 1 | 0.4902 |
| 7 | 2 | 526 | 2 | 0.5137 |
| 14 | 4 | 553 | 4 | 0.5400 |
| 8 | 2 | 602 | 2 | 0.5879 |
| 15 | 4 | 616 | 4 | 0.6016 |

Table 3 below shows an example of the first table determined by step S203. Table 3 corresponds to Table 2 described above. After renumbering the MCS indexes in Table 2, Table 3 may be obtained, that is, the first table is determined.

TABLE 3

Example of the first table

| MCS Index $I_{MCS}$ | Modulation Order $Q_m$ | Coding Rate R r × [1024] | Spreading Factor | Spectral Efficiency |
|---|---|---|---|---|
| 0 | 2 | 120 | 4 | 0.0586 |
| 1 | 2 | 157 | 4 | 0.0767 |
| 2 | 2 | 193 | 4 | 0.0942 |
| 3 | 2 | 120 | 2 | 0.1172 |
| 4 | 2 | 251 | 4 | 0.1226 |
| 5 | 2 | 308 | 4 | 0.1504 |
| 6 | 2 | 157 | 2 | 0.1533 |
| 7 | 2 | 379 | 4 | 0.1851 |
| 8 | 2 | 193 | 2 | 0.1885 |
| 9 | 2 | 449 | 4 | 0.2192 |
| 10 | 2 | 120 | 1 | 0.2344 |
| 11 | 2 | 251 | 2 | 0.2451 |
| 12 | 2 | 526 | 4 | 0.2568 |
| 13 | 2 | 602 | 4 | 0.2939 |
| 14 | 2 | 308 | 2 | 0.3008 |
| 15 | 2 | 157 | 1 | 0.3066 |
| 16 | 2 | 679 | 4 | 0.3315 |
| 17 | 4 | 340 | 4 | 0.3320 |
| 18 | 4 | 378 | 4 | 0.3691 |
| 19 | 2 | 379 | 2 | 0.3701 |

TABLE 3-continued

Example of the first table

| MCS Index $I_{MCS}$ | Modulation Order $Q_m$ | Coding Rate R r × [1024] | Spreading Factor | Spectral Efficiency |
|---|---|---|---|---|
| 20 | 2 | 193 | 1 | 0.3770 |
| 21 | 4 | 434 | 4 | 0.4238 |
| 22 | 2 | 449 | 2 | 0.4385 |
| 23 | 4 | 490 | 4 | 0.4785 |
| 24 | 2 | 251 | 1 | 0.4902 |
| 25 | 2 | 526 | 2 | 0.5137 |
| 26 | 4 | 553 | 4 | 0.5400 |
| 27 | 2 | 602 | 2 | 0.5879 |
| 28 | 4 | 616 | 4 | 0.6016 |
| 29 | 2 | Reserved | | |
| 30 | 4 | Reserved | | |
| 31 | 6 | Reserved | | |

In addition, Table 4 below shows examples of relatively small 29 spectral efficiencies obtained by step 202. The 29 spectral efficiencies in Table 4 are the 1st, 3rd, . . . , 57th spectral efficiencies selected from 87 spectral efficiencies after sorting the 87 spectral efficiencies in ascending order. For example, after sorting the 87 spectral efficiencies in ascending order, the 1st, 3rd, . . . , 57th spectral efficiencies may be selected and sequentially filled in the spectral efficiency column (that is, the fifth column) in ascending order, and then MCS indexes and spreading factors corresponding to the 29 spectral efficiencies are filled in the MCS index column (that is, the first column) and the spreading factor column (the fourth column) respectively. At the same time, modulation orders and coding rates corresponding to the MCS indexes may also be filled in the modulation order column (that is, the second column) and the coding rate column (that is, the third column), respectively. In this way, the following Table 4 is determined.

TABLE 4

Another example of the selected spectral efficiencies

| MCS Index $I_{MCS}$ | Modulation Order $Q_m$ | Coding Rate R r × [1024] | Spreading Factor | Spectral Efficiency |
|---|---|---|---|---|
| 0 | 2 | 120 | 4 | 0.0586 |
| 2 | 2 | 193 | 4 | 0.0942 |
| 3 | 2 | 251 | 4 | 0.1226 |
| 1 | 2 | 157 | 2 | 0.1533 |
| 2 | 2 | 193 | 2 | 0.1885 |
| 0 | 2 | 120 | 1 | 0.2344 |
| 7 | 2 | 526 | 4 | 0.2568 |
| 4 | 2 | 308 | 2 | 0.3008 |
| 9 | 2 | 679 | 4 | 0.3315 |
| 11 | 4 | 378 | 4 | 0.3691 |
| 2 | 2 | 193 | 1 | 0.3770 |
| 6 | 2 | 449 | 2 | 0.4385 |
| 3 | 2 | 251 | 1 | 0.4902 |
| 14 | 4 | 553 | 4 | 0.5400 |
| 15 | 4 | 616 | 4 | 0.6016 |
| 17 | 6 | 438 | 4 | 0.6416 |
| 9 | 2 | 679 | 2 | 0.6631 |
| 18 | 6 | 466 | 4 | 0.6826 |
| 5 | 2 | 379 | 1 | 0.7402 |
| 20 | 6 | 567 | 4 | 0.8306 |
| 6 | 2 | 449 | 1 | 0.8770 |
| 13 | 4 | 490 | 2 | 0.9570 |
| 7 | 2 | 526 | 1 | 1.0273 |
| 14 | 4 | 553 | 2 | 1.0801 |
| 8 | 2 | 602 | 1 | 1.1758 |
| 25 | 6 | 822 | 4 | 1.2041 |
| 17 | 6 | 438 | 2 | 1.2832 |
| 9 | 2 | 679 | 1 | 1.3262 |
| 27 | 6 | 910 | 4 | 1.3330 |

Table 5 below shows another example of the first table determined by step S203. Table 5 corresponds to Table 4 described above. After renumbering the MCS indexes in Table 4, Table 5 may be obtained, that is, the first table is determined.

TABLE 5

Example of the first table

| MCS Index $I_{MCS}$ | Modulation Order $Q_m$ | Coding Rate R r × [1024] | Spreading Factor | Spectral Efficiency |
|---|---|---|---|---|
| 0 | 2 | 120 | 4 | 0.0586 |
| 1 | 2 | 193 | 4 | 0.0942 |
| 2 | 2 | 251 | 4 | 0.1226 |
| 3 | 2 | 157 | 2 | 0.1533 |
| 4 | 2 | 193 | 2 | 0.1885 |
| 5 | 2 | 120 | 1 | 0.2344 |
| 6 | 2 | 526 | 4 | 0.2568 |
| 7 | 2 | 308 | 2 | 0.3008 |
| 8 | 2 | 679 | 4 | 0.3315 |
| 9 | 4 | 378 | 4 | 0.3691 |
| 10 | 2 | 193 | 1 | 0.3770 |
| 11 | 2 | 449 | 2 | 0.4385 |
| 12 | 2 | 251 | 1 | 0.4902 |
| 13 | 4 | 553 | 4 | 0.5400 |
| 14 | 4 | 616 | 4 | 0.6016 |
| 15 | 6 | 438 | 4 | 0.6416 |
| 16 | 2 | 679 | 2 | 0.6631 |
| 17 | 6 | 466 | 4 | 0.6826 |
| 18 | 2 | 379 | 1 | 0.7402 |
| 19 | 6 | 567 | 4 | 0.8306 |
| 20 | 2 | 449 | 1 | 0.8770 |
| 21 | 4 | 490 | 2 | 0.9570 |
| 22 | 2 | 526 | 1 | 1.0273 |
| 23 | 4 | 553 | 2 | 1.0801 |
| 24 | 2 | 602 | 1 | 1.1758 |
| 25 | 6 | 822 | 4 | 1.2041 |
| 26 | 6 | 438 | 2 | 1.2832 |
| 27 | 2 | 679 | 1 | 1.3262 |
| 28 | 6 | 910 | 4 | 1.3330 |
| 29 | 2 | Reserved | | |
| 30 | 4 | Reserved | | |
| 31 | 6 | Reserved | | |

In addition, as described above, the first table may only include a plurality of indexes and spreading parameters corresponding to respective indexes. Table 6 below shows an example of the first table including only a plurality of indexes and spreading parameters corresponding to respective indexes.

TABLE 6

Another example of the first table

| MCS Index $I_{MCS}$ | Spreading Factor |
|---|---|
| 0 | 4 |
| 1 | 4 |
| 2 | 4 |
| 3 | 2 |
| 4 | 4 |
| 5 | 4 |
| 6 | 2 |
| 7 | 4 |
| 8 | 2 |
| 9 | 4 |
| 10 | 1 |
| 11 | 2 |
| 12 | 4 |
| 13 | 4 |
| 14 | 2 |
| 15 | 1 |
| 16 | 4 |
| 17 | 4 |
| 18 | 4 |

TABLE 6-continued

Another example of the first table

| MCS Index $I_{MCS}$ | Spreading Factor |
|---|---|
| 19 | 2 |
| 20 | 1 |
| 21 | 4 |
| 22 | 2 |
| 23 | 4 |
| 24 | 1 |
| 25 | 2 |
| 26 | 4 |
| 27 | 2 |
| 28 | 4 |
| 29 | Reserved |
| 30 | Reserved |
| 31 | Reserved |

The example of determining the first table according to modulation parameters, coding parameters, and candidate spreading parameters is described above in conjunction with FIG. 2 and Tables 1-6. According to another example of the present disclosure, the first table may be obtained by improving a predetermined MCS table, and the predetermined MCS table may include MCS indexes and modulation parameters, coding parameters, and spectral efficiencies corresponding to the MCS indexes. The predetermined MCS table may be, for example, an MCS table determined by 3GPP standard specifications (for example, 3GPP TS 38.214).

According to one example of the present disclosure, the spreading parameter for the user terminal may be determined according to the coding parameter for the user terminal in the MCS table. For example, the spreading parameter for the user terminal may be determined by comparing the coding parameter for the user terminal and a coding parameter threshold. For example, when the coding rate for the user terminal is less than or equal to a first coding rate threshold, the spreading factor for the user terminal may be set to a first spreading factor; when the coding rate for the user terminal is greater than the first coding rate threshold and is less than or equal to a second coding rate threshold, the spreading factor for the user terminal may be set to a second spreading factor; and when the coding rate for the user terminal is greater than the second coding rate threshold and less than a maximum coding rate threshold, the spreading factor for the user terminal may be set to a third spreading factor.

For example, a value of the first coding rate threshold may be 237, and a value of the first spreading factor may be 4; a value of the second coding rate threshold may be 474, and a value of the second spreading factor may be 2; and a value of the maximum coding rate threshold may be 948, and a value of the third spreading factor may be 1. Determination of these values takes into account that the current 3GPP has specified the maximum value of the actual coding rate r, that is, the actual coding rate r≤948/1024, and then the target coding rate R≤(948/1024×1024=948). Therefore, the maximum value of R may be determined to be 948.

In this example, after the spreading parameter for the user terminal is determined according to the coding parameter for the user terminal, the spreading parameter for the user terminal may be added to the MCS table to generate the first table.

With the above examples, the user terminal may obtain the spreading parameter for the user terminal by querying the first table, so as to spread symbols by using the queried spreading parameter. However, the present invention is not limited thereto. According to another example of the present disclosure, the user terminal may not add the spreading parameter for the user terminal to the MCS table to generate the first table. For example, the user terminal may determine, according to a received MCS index, a coding parameter corresponding to the MCS index, and then determine the spreading parameter for the user terminal by comparing the coding parameter and the coding parameter thresholds, and spread symbols by using the determined spreading parameter.

In addition, according to one example of the present disclosure, after the spreading parameter for the user terminal is determined according to the coding parameter for the user terminal, the coding parameter for the user terminal may further be updated according to the spreading parameter for the user terminal, so as to keep the spectral efficiency unchanged before and after adding the spreading parameter. For example, the spreading factor for the user terminal and an original coding rate for the user terminal may be multiplied to obtain a current coding rate for the user terminal, and the current coding rate for the user terminal may be used to update the original coding rate.

For example, when the spreading factor is 4, the original coding rate may be updated to be 4 times the original coding rate, that is, the current coding rate is 4 times the original coding rate; when the spreading factor is 2, the original coding rate may be updated to be twice the original coding rate, that is, the current coding rate is twice the original coding rate; and when the spreading factor is 1, the original coding rate may not be updated, that is, the current coding rate is the same as the original coding rate. In this way, it may be ensured that the spectral efficiency for the user terminal does not change, thereby reducing the impact on a size of a transport block for the user terminal. In this case, the first table may include the updated coding rate.

In addition, in this example, a communication device may only store the first table, and no longer store the existing MCS table. Alternatively, the communication device may also store MCS indexes of the first table and spreading parameters corresponding to the MCS indexes, as well as the existing MCS table.

An example of obtaining the first table by improving an existing MCS table will be described below in conjunction with Table 7 and taking M=32, N=3, and K=29 as an example. Table 7 below shows another example of the first table. Compared with the existing MCS table, spreading parameters are added and coding parameters are updated in Table 7 below.

TABLE 7

Another example of the first table

| MCS Index $I_{MCS}$ | Modulation Order $Q_m$ | Coding Rate R r × [1024] | Spreading Factor | Spectral Efficiency |
|---|---|---|---|---|
| 0 | 2 | 480 | 4 | 0.2344 |
| 1 | 2 | 628 | 4 | 0.3066 |
| 2 | 2 | 772 | 4 | 0.3770 |
| 3 | 2 | 502 | 2 | 0.4902 |
| 4 | 2 | 616 | 2 | 0.6016 |
| 5 | 2 | 758 | 2 | 0.7402 |
| 6 | 2 | 898 | 2 | 0.8770 |
| 7 | 2 | 526 | 1 | 1.0273 |
| 8 | 2 | 602 | 1 | 1.1758 |
| 9 | 2 | 679 | 1 | 1.3262 |
| 10 | 4 | 680 | 2 | 1.3281 |
| 11 | 4 | 756 | 2 | 1.4766 |
| 12 | 4 | 868 | 2 | 1.6953 |
| 13 | 4 | 490 | 1 | 1.9141 |

TABLE 7-continued

Another example of the first table

| MCS Index $I_{MCS}$ | Modulation Order $Q_m$ | Coding Rate R r × [1024] | Spreading Factor | Spectral Efficiency |
|---|---|---|---|---|
| 14 | 4 | 553 | 1 | 2.1602 |
| 15 | 4 | 616 | 1 | 2.4063 |
| 16 | 4 | 658 | 1 | 2.5703 |
| 17 | 6 | 876 | 2 | 2.5664 |
| 18 | 6 | 932 | 2 | 2.7305 |
| 19 | 6 | 517 | 1 | 3.0293 |
| 20 | 6 | 567 | 1 | 3.3223 |
| 21 | 6 | 616 | 1 | 3.6094 |
| 22 | 6 | 666 | 1 | 3.9023 |
| 23 | 6 | 719 | 1 | 4.2129 |
| 24 | 6 | 772 | 1 | 4.5234 |
| 25 | 6 | 822 | 1 | 4.8164 |
| 26 | 6 | 873 | 1 | 5.1152 |
| 27 | 6 | 910 | 1 | 5.3320 |
| 28 | 6 | 948 | 1 | 5.5547 |
| 29 | 2 | | Reserved | |
| 30 | 4 | | Reserved | |
| 31 | 6 | | Reserved | |

In addition, the method for determining the first table as described above may be performed by a communication device, such as a base station, a user terminal, and the like. In this case, the communication device may store the determined first table after performing the method for determining the first table. However, the present disclosure is not limited thereto. In another example of the present disclosure, the method for determining the first table may also be performed by a core network device. In this case, the core network device may notify a base station or a user terminal of the determined first table, and then the base station or the user terminal stores the first table. In addition, in another example of the present disclosure, the method for determining the first table may not be performed by the communication device or the core network device, but by the manufacturer before the communication device or the core network device leaves the factory. In this case, the first table may be a table that has been stored inside the communication device when the communication device leaves the factory.

In addition, according to one example of the present disclosure, the method 100 may further include: determining a size of a transport block for the user terminal according to the information about modulation and coding and the spreading parameter for the user terminal. For example, the modulation parameter, the coding parameter, and the spreading parameter for the user terminal may be determined according to the information about modulation and coding, and then the size of the transport block for the user terminal may be determined according to the modulation parameter, the coding parameter, and the spreading parameter for the user terminal. For example, an intermediate value $N_{info}$ used to determine the size of the transport block for the user terminal may be calculated by the following formula (1):

$$N_{info}=N_{RE}*R*Q_m*v/s \quad (1)$$

where $N_{RE}$ represents the number of REs for the user terminal, R represents the coding rate for the user terminal, $Q_m$ represents the modulation order for the user terminal, v represents the number of data streams used for the user terminal, and s represents the spreading factor for the user terminal.

After the intermediate value $N_{info}$ is calculated according to the above formula (1), the size of the transport block for the user terminal may be calculated according to a calculation method specified in the existing 3GPP standard specifications.

With the method performed by the user terminal in this embodiment, the user terminal may determine the spreading factor for the user terminal according to the information about modulation and coding received from the base station, without the need of transmitting the spreading parameter as a part of control signaling to the user terminal, thereby reducing signaling overhead and saving wireless transmission resources.

Figure 3:
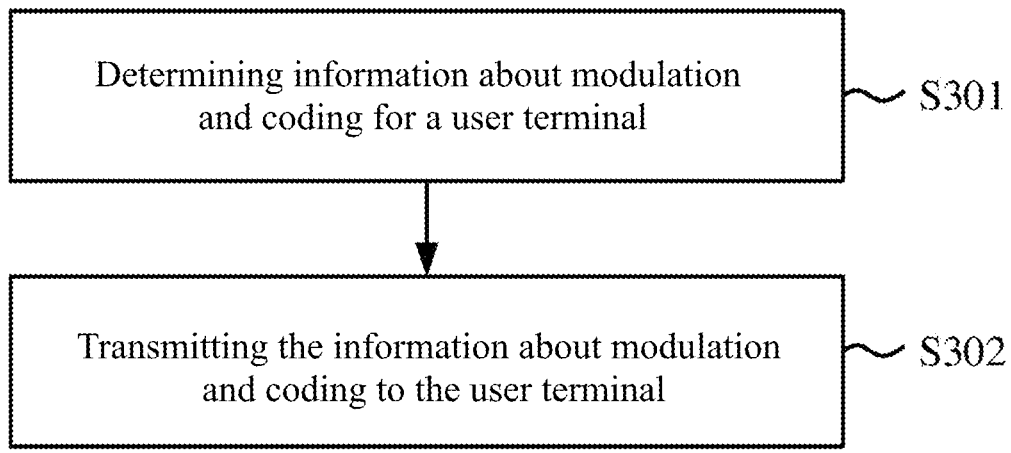
FIG. 3 is a flowchart of a communication method performed by a base station according to an embodiment of the present disclosure.

A communication method at the base station side corresponding to the method 100 shown in FIG. 1 according to an embodiment of the present disclosure will be described below with reference to FIG. 3. FIG. 3 is a flowchart of a communication method 300 performed by a base station according to an embodiment of the present disclosure. Since the method 300 has the same details as the method 100 described above with reference to FIG. 1, detailed description of the same content is omitted herein for the sake of simplicity.

As shown in FIG. 3, in step S301, the base station determines information about modulation and coding for a user terminal. The information about modulation and coding may be information used to indicate modulation and coding, for example, index information for a Modulation and Coding Scheme (MCS).

According to one example of the present disclosure, the MCS may be determined by the base station according to a wireless channel condition between the user terminal and the base station. For example, the MCS may be determined by the base station according to a Channel Quality Indicator (CQI) reported by the user terminal. For another example, the MCS may be determined by the base station according to a CQI obtained by measuring an uplink reference signal, and the uplink reference signal may be, for example, a Demodulation Reference Signal (DMRS), a Sounding Reference Signal (SRS) and the like.

Then, in step S302, the base station transmits the information about modulation and coding to the user terminal, so that the user terminal determines a spreading parameter according to the information about modulation and coding, where the spreading parameter is used for the user terminal to spread symbols.

According to one example of the present disclosure, the base station may transmit the information about modulation and coding to the user terminal through RRC signaling, DCI, MAC CE or the like. Accordingly, the user terminal may obtain the information about modulation and coding by receiving the RRC signaling, DCI, MAC CE from the base station, so that the user terminal may determine the spreading parameter according to the information about modulation and coding.

With the method performed by the base station in this embodiment, the user terminal may determine the spreading factor for the user terminal according to the information about modulation and coding received from the base station, without the need of the base station transmitting the spreading parameter as a part of control signaling to the user terminal, thereby reducing signaling overhead and saving wireless transmission resources.

Figure 4:
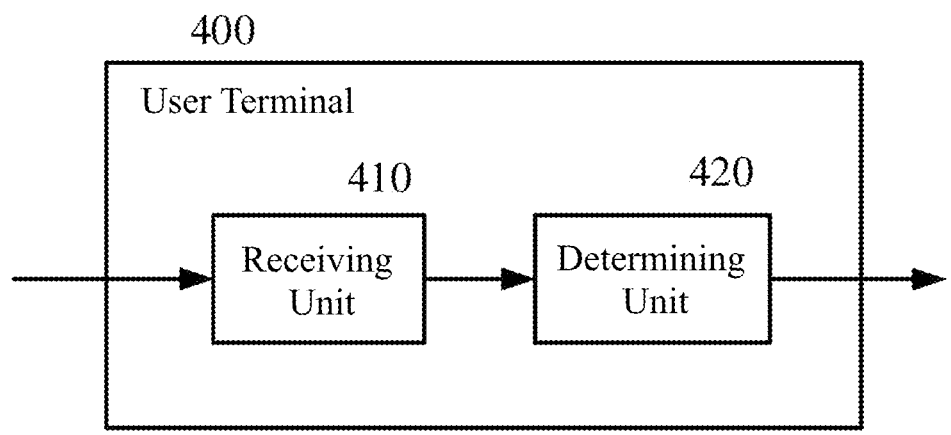
FIG. 4 is a block diagram of a user terminal that performs the method shown in FIG. 1 according to an embodiment of the present disclosure.

A user terminal performing the method 100 shown in FIG. 1 according to an embodiment of the present disclosure will be described below with reference to FIG. 4. FIG. 4 shows a block diagram of a user terminal 400 according to an embodiment of the present disclosure. Since functions of the user terminal 400 are the same as the details of the method 100 described above with reference to FIG. 1, detailed description of the same content is omitted herein for the sake of simplicity.

As shown in FIG. 4, the user terminal 400 includes a receiving unit 410 configured to receive information about modulation and coding from a base station; and a determining unit 420 configured to determine a spreading parameter for the user terminal according to the information about modulation and coding, where the spreading parameter is used for the user terminal to spread symbols. The user terminal 400 may further include other units in addition to the above two units, but since these units are irrelevant to the present disclosure, description of these units is omitted.

According to one example of the present disclosure, the determining unit 420 may determine a modulation parameter and a coding parameter for the user terminal according to the information about modulation and coding. For example, the user terminal may receive index information for MCS from the base station to determine an available modulation parameter and coding parameter, instead of receiving information for a specific modulation parameter and coding parameter from the base station.

According to another example of the present disclosure, the determining unit 420 may also determine spectral efficiency for the user terminal according to the information about modulation and coding. For example, the user terminal may receive the index information for MCS from the base station to determine the spectral efficiency, instead of acquiring a specific value of the spectral efficiency from the base station.

With the above examples of the present disclosure, the user terminal may determine the modulation parameter, the coding parameter, the spreading parameter, and the spectral efficiency for the user terminal according to the information about modulation and coding received from the base station, so that the user terminal may encode and modulate data bits by using the modulation parameter and the coding parameter to obtain symbols, spread the symbols by using the spreading parameter, and acquire the corresponding spectral efficiency in the case of the modulation parameter, the coding parameter, and the spreading parameter at the same time.

How the determining unit 420 determines the spreading parameter for the user terminal according to the information about modulation and coding will be described below. According to one example of the present disclosure, the determining unit 420 may determine the spreading parameter for the user terminal according to an index of the modulation and coding scheme and a first table, the first table including a plurality of indexes and spreading parameters corresponding to respective indexes.

According to one example of the present disclosure, in addition to the plurality of indexes and spreading parameters corresponding to respective indexes, the first table may further include one or more of a modulation parameter, a coding parameter, and spectral efficiency corresponding to each index. For example, the spectral efficiency for the user terminal may be determined according to the modulation parameter, the coding parameter, and the spreading parameter for the user terminal. For example, the spectral efficiency of the present disclosure may be calculated according to the modulation parameter, the coding parameter, and the spreading parameter for the user terminal in a conventional way of calculating spectral efficiency.

In addition, according to one example of the present disclosure, the first table may be determined according to modulation parameters, coding parameters, and candidate spreading parameters. For example, the determining unit 420 may determine a set of spectral efficiencies according to modulation parameters, coding parameters, and candidate spreading parameters. For example, the modulation parameters and the coding parameters herein may be M candidate modulation parameters and candidate coding parameters, and the candidate spreading parameters herein may be N candidate spreading parameters, where M and N are both positive integers. Since there are M possibilities for the modulation parameters and the coding parameters, and N possibilities for the candidate spreading parameters, the set of spectral efficiencies may include M×N elements.

Then, the determining unit 420 may select a predetermined number of spectral efficiencies from the set of spectral efficiencies. In the present disclosure, the predetermined number may be represented by K, and K is a positive integer. For example, the user terminal may select the smallest or relatively small spectral efficiencies corresponding to the predetermined number from the set of spectral efficiencies, so that the user terminal suffers less interference in the scenario of small data packet transmission, which improves communication quality of the user terminal.

Then, the determining unit 420 may obtain a plurality of spreading parameters included in the first table according to candidate spreading parameters corresponding to the predetermined number of spectral efficiencies, to determine the first table. For example, MCS indexes corresponding to the predetermined number of spectral efficiencies may be renumbered to obtain a plurality of indexes included in the first table; and the candidate spreading parameters corresponding to the predetermined number of spectral efficiencies may be determined as the plurality of spreading parameters included in the first table.

According to another example of the present disclosure, the first table may be obtained by improving a predetermined MCS table, and the predetermined MCS table may include MCS indexes and modulation parameters, coding parameters, and spectral efficiencies corresponding to the MCS indexes. The predetermined MCS table may be, for example, an MCS table determined by 3GPP standard specifications (for example, 3GPP TS 38.214).

According to one example of the present disclosure, the spreading parameter for the user terminal may be determined according to the coding parameter for the user terminal in the MCS table. For example, the spreading parameter for the user terminal may be determined by comparing the coding parameter for the user terminal and a coding parameter threshold.

In this example, after the spreading parameter for the user terminal is determined according to the coding parameter for the user terminal, the spreading parameter for the user terminal may be added to the MCS table to generate the first table.

In addition, according to one example of the present disclosure, after the spreading parameter for the user terminal is determined according to the coding parameter for the user terminal, the coding parameter for the user terminal may further be updated according to the spreading parameter for the user terminal, so as to keep the spectral efficiency unchanged before and after adding the spreading parameter.

In addition, according to one example of the present disclosure, the determining unit 420 may further be configured to determine a size of a transport block for the user terminal according to the information about modulation and coding and the spreading parameter for the user terminal. For example, the modulation parameter, the coding parameter, and the spreading parameter for the user terminal may be determined according to the information about modulation and coding, and then the size of the transport block for the user terminal may be determined according to the modulation parameter, the coding parameter, and the spreading parameter for the user terminal.

With the user terminal in this embodiment, the user terminal may determine the spreading factor for the user terminal according to the information about modulation and coding received from the base station, without the need of the base station transmitting the spreading parameter as a part of control signaling to the user terminal, thereby reducing signaling overhead and saving wireless transmission resources.

Figure 5:
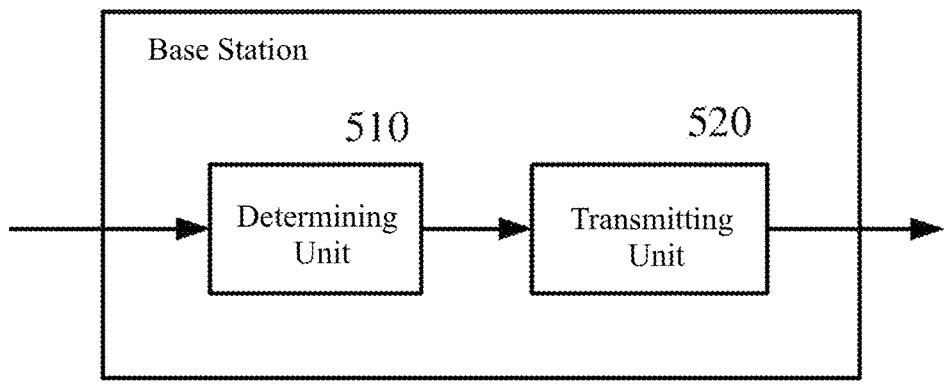
FIG. 5 is a block diagram of a base station that performs the method shown in FIG. 3 according to an embodiment of the present disclosure.

A base station performing the method 300 shown in FIG. 3 according to an embodiment of the present disclosure will be described below with reference to FIG. 5. FIG. 5 shows a block diagram of a base station 500 according to an embodiment of the present disclosure. Since functions of the base station 500 are the same as the details of the method 300 described above with reference to FIG. 3, detailed description of the same content is omitted herein for the sake of simplicity.

As shown in FIG. 5, the base station 500 includes a determining unit 510 configured to determine information about modulation and coding for a user terminal; and a transmitting unit 520 configured to transmit the information about modulation and coding to the user terminal, so that the user terminal determines a spreading parameter according to the information about modulation and coding, where the spreading parameter is used for the user terminal to spread symbols. The base station 500 may further include other units in addition to the above two units, but since these units are irrelevant to the present disclosure, description of these units is omitted.

According to one example of the present disclosure, the information about modulation and coding may be information used to indicate modulation and coding, for example, index information for a Modulation and Coding Scheme (MCS). The MCS may be determined by the base station according to a wireless channel condition between the user terminal and the base station. For example, the MCS may be determined by the base station according to a Channel Quality Indicator (CQI) reported by the user terminal. For another example, the MCS may be determined by the base station according to a CQI obtained by measuring an uplink reference signal, and the uplink reference signal may be, for example, a Demodulation Reference Signal (DMRS), a Sounding Reference Signal (SRS) and the like.

According to one example of the present disclosure, the transmitting unit 520 may transmit the information about modulation and coding to the user terminal through RRC signaling, DCI, MAC CE or the like. Accordingly, the user terminal may obtain the information about modulation and coding by receiving the RRC signaling, DCI, MAC CE from the base station, so that the user terminal may determine the spreading parameter according to the information about modulation and coding.

With the base station in this embodiment, the user terminal may determine the spreading factor for the user terminal according to the information about modulation and coding received from the base station, without the need of the base station transmitting the spreading parameter as a part of control signaling to the user terminal, thereby reducing signaling overhead and saving wireless transmission resources.

<Hardware Structure>

In addition, block diagrams used in the description of the above embodiments illustrate blocks in units of functions. These functional blocks (structural blocks) may be implemented in arbitrary combination of hardware and/or software. Furthermore, means for implementing respective functional blocks is not particularly limited. That is, the respective functional blocks may be implemented by one apparatus that is physically and/or logically jointed; or more than two apparatuses that are physically and/or logically separated may be directly and/or indirectly connected (e.g. via wire and/or wireless), and the respective functional blocks may be implemented by these apparatuses.

Figure 6:
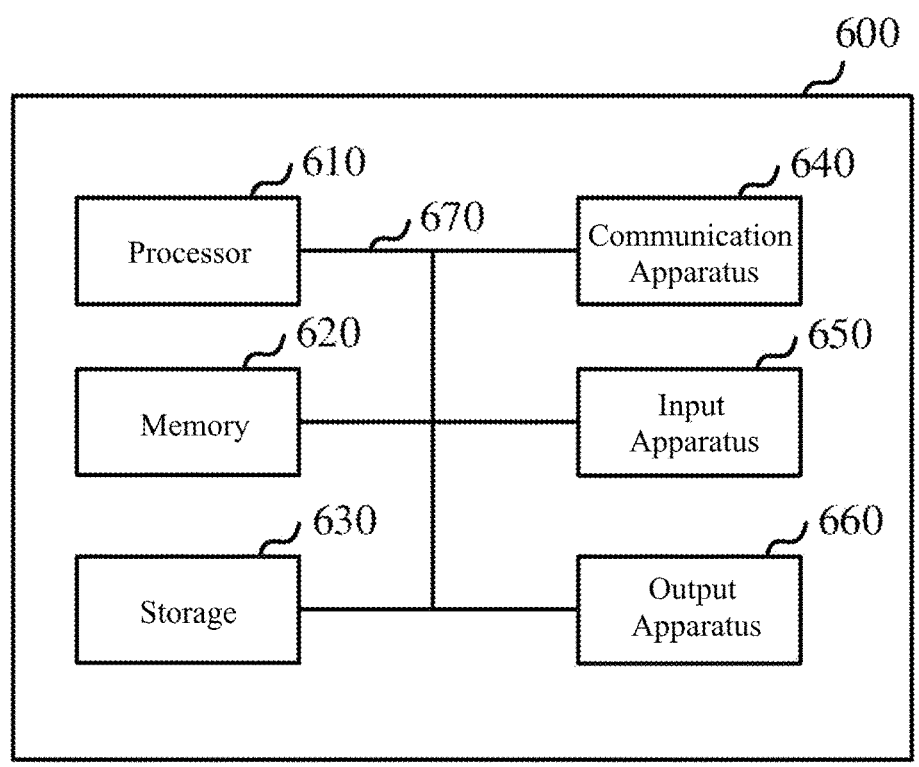
FIG. 6 is a schematic diagram of a hardware structure of a communication device according to an embodiment of the present disclosure.

For example, the base station, the user terminal and the like in one embodiment of the present disclosure may function as a computer that executes the processes of the wireless communication method of the present disclosure. FIG. 6 is a diagram illustrating an example of a hardware structure of a wireless base station and a user terminal involved in one embodiment of the present disclosure. The user terminal 400 or the base station 500 described above may be constituted as a computer apparatus that physically comprises a processor 610, a memory 620, a storage 630, a communication apparatus 640, a bus 650 and the like In addition, in the following description, terms such as "apparatus" may be replaced with circuits, devices, units, and the like. The hardware structure of the user terminal 400 and the base station 500 may include one or more of the respective apparatuses shown in the figure, or may not include a part of the apparatuses.

For example, only one processor 610 is illustrated, but there may be a plurality of processors. Furthermore, processes may be performed by one processor, or processes may be performed by more than one processor simultaneously, sequentially, or by other methods. In addition, the processor 610 may be installed by more than one chip.

Respective functions of the user terminal 400 and the base station 500 may be implemented, for example, by reading specified software (program) onto hardware such as the processor 610 and the memory 620, so that the processor 610 performs computations, controls communication performed by the communication apparatus 640, and controls reading and/or writing of data in the memory 620 and the storage 630.

The processor 610, for example, operates an operating system to control the entire computer. The processor 610 may be constituted by a Central Processing Unit (CPU), which includes interfaces with peripheral apparatuses, a control apparatus, a computing apparatus, a register and the like. For example, the determining unit, the receiving unit and the like described above may be implemented by the processor 610.

In addition, the processor 610 reads programs (program codes), software modules and data from the storage 630 and/or the communication apparatus 640 to the memory 620, and execute various processes according to them. As for the program, a program causing computers to execute at least a part of the operations described in the above embodiments may be employed. For example, the determining unit of the user terminal 800 may be implemented by a control program stored in the memory 620 and operated by the processor 610, and other functional blocks may also be implemented similarly.

The memory 620 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 620 may also be referred to as a register, a cache, a main memory (a main storage apparatus) and the like. The memory 620 may store executable programs (program codes), software modules and the like for implementing the wireless communication method involved in one embodiment of the present disclosure.

The storage 630 is a computer-readable recording medium, and may be constituted, for example, by at least one of a flexible disk, a Floppy® disk, a magneto-optical disk (e.g., a Compact Disc ROM (CD-ROM) and the like), a digital versatile disk, a Blu-ray® disk, a removable disk, a hard driver, a smart card, a flash memory device (e.g., a card, a stick and a key driver), a magnetic stripe, a database, a server, and other appropriate storage media. The storage 630 may also be referred to as an auxiliary storage apparatus.

The communication apparatus 640 is a hardware (transceiver device) performing communication between computers via a wired and/or wireless network, and is also referred to as a network device, a network controller, a network card, a communication module and the like, for example. The communication apparatus 640 may include a high-frequency switch, a duplexer, a filter, a frequency synthesizer and the like to implement, for example, Frequency Division Duplex (FDD) and/or Time Division Duplex (TDD). For example, the transmitting unit, the receiving unit and the like described above may be implemented by the communication apparatus 640.

Furthermore, the respective apparatuses such as the processor 610 and the memory 620 are connected by the bus 650 that communicates information. The bus 650 may be constituted by a single bus or by different buses between the apparatuses.

Furthermore, the user terminal 400 and the base station 500 may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 610 may be installed by at least one of the hardware.

(Variations)

In addition, the terms illustrated in the present specification and/or the terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a "pilot", a "pilot signal" and so on, depending on the standard applied. Furthermore, a component carrier (CC) may also be referred to as a cell, a frequency carrier, a carrier frequency, and the like.

Furthermore, the information, parameters and so on described in this specification may be represented in absolute values or in relative values with respect to specified values, or may be represented by other corresponding information. For example, radio resources may be indicated by specified indexes. Furthermore, formulas and the like using these parameters may be different from those explicitly disclosed in this specification.

The names used for the parameters and the like in this specification are not limited in any respect. For example, since various channels (Physical Uplink Control Channels (PUCCHs), Physical Downlink Control Channels (PDCCHs), etc.) and information elements may be identified by any suitable names, the various names assigned to these various channels and information elements are not limitative in any respect.

The information, signals and the like described in this specification may be represented by using any one of various different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

The information, signals and the like that are input or output may be stored in a specific location (for example, in a memory), or may be managed in a control table. The information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, downlink control information (DCI), uplink control information (UCI)), higher layer signaling (for example, RRC (Radio Resource Control) signaling, broadcast information (master information blocks (MIBs), system information blocks (SIBs), etc.), MAC (Medium Access Control) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as "RRC messages", for example, RRC connection setup messages, RRC connection reconfiguration messages, and so on. Furthermore, MAC signaling may be reported by using, for example, MAC control elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (Boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. The base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH)). Terms like "cell" and "sector" refer to a part of or an entirety of the coverage area of a base station and/or a sub-system of the base station that provides communication services in this coverage.

In this specification, terms such as "Mobile Station (MS) ", "user terminal", "User Equipment (UE)", and "terminal" may be used interchangeably. The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, the wireless base station in this specification may also be replaced with a user terminal. For example, for a structure in which communication between a wireless base station and a user terminal is replaced with communication between a plurality of user terminals (Device-to-Device, D2D), respective manners/embodiments of the present disclosure may also be applied. At this time, functions provided by the above user terminal 400 or the base station 500 may be regarded as functions provided by a user terminal. Furthermore, the words "uplink" and "downlink" may also be replaced with "side". For example, an uplink channel may be replaced with a side channel.

Also, the user terminal in this specification may be replaced with a wireless base station. At this time, functions provided by the above user terminal may be regarded as functions provided by the user terminal 400 or the base station 500.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched and used during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (New Radio Access Technology), NR (New Radio), NX (New radio access), FX (Future generation radio access), GSM® (Global System for Mobile communications), CDMA 4000, UMB (Ultra Mobile Broadband), IEEE 802.11 (Wi-Fi), IEEE 802.16 (WiMAX®), IEEE 802.20, UWB (Ultra-Wide Band), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting, accessing (e.g., accessing data in a memory), etc. as performing the "deciding (determining)". In addition, the "deciding (determining)" may further regard resolving, selecting, choosing, establishing, comparing, etc. as performing the "deciding (determining)". That is to say, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described in detail above, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

What is claimed is:

1. A communication method performed by a terminal, the method comprising:
   receiving information about modulation and coding from a base station; and
   determining a spreading parameter for the terminal according to the information about modulation and coding, wherein the spreading parameter is used for the terminal to spread symbols,
   wherein the information about modulation and coding includes index information for a modulation and coding scheme, the determining a spreading parameter for the terminal according to the information about modulation and coding includes:
      determining the spreading parameter for the terminal according to an index of the modulation and coding scheme and a first table, the first table including a plurality of indexes and spreading parameters corresponding to respective indexes, wherein the first table is determined by the following steps:
         determining a set of spectral efficiencies according to modulation parameters, coding parameters and candidate spreading parameters;
         selecting a predetermined number of spectral efficiencies from the set of spectral efficiencies;
         obtaining a plurality of spreading parameters included in the first table according to candidate spreading parameters corresponding to the predetermined number of spectral efficiencies to determine the first table.

2. The method of claim 1, further comprising:
   determining at least one of a modulation parameter, a coding parameter, and spectral efficiency for the terminal according to the information about modulation and coding.

3. The method of claim 2, wherein the spectral efficiency is determined based on the modulation parameter, the coding parameter, and the spreading parameter for the terminal.

4. The method of claim 1, wherein the spreading parameter for the terminal is determined according to the coding parameter for the terminal.

5. The method of claim 4, further comprising:
   updating the coding parameter for the terminal according to the spreading parameter for the terminal.

6. A terminal, comprising:
   a processor;
   a storage medium having computer program instructions stored thereon, wherein the computer program instructions, when executed by the processor, perform processing of:
      receiving information about modulation and coding from a base station; and
      determining a spreading parameter for the terminal according to the information about modulation and coding, wherein the spreading parameter is used for the terminal to spread symbols,
   wherein the information about modulation and coding includes index information for a modulation and coding scheme, the processor is configured to determine the spreading parameter for the terminal according to an index of the modulation and coding scheme and a first table, the first table including a plurality of indexes and spreading parameters corresponding to respective indexes, wherein the first table is determined by the following steps:
      determining a set of spectral efficiencies according to modulation parameters, coding parameters and candidate spreading parameters;
      selecting a predetermined number of spectral efficiencies from the set of spectral efficiencies;
      obtaining a plurality of spreading parameters included in the first table according to candidate spreading parameters corresponding to the predetermined number of spectral efficiencies to determine the first table.

7. The terminal of claim 6, wherein the processor is further configured to determine at least one of a modulation parameter, a coding parameter, and spectral efficiency for the terminal according to the information about modulation and coding.

8. The terminal of claim 7, wherein the spectral efficiency is determined based on the modulation parameter, the coding parameter, and the spreading parameter for the terminal.

9. The terminal of claim 6, wherein the spreading parameter for the terminal is determined according to the coding parameter for the terminal.

10. The terminal of claim 9,
    wherein the processor is further configured to update the coding parameter for the terminal according to the spreading parameter for the terminal.

11. A base station, comprising:
    a processor;
    a storage medium having computer program instructions stored thereon, wherein the computer program instructions, when executed by the processor, perform processing of:
       determining information about modulation and coding for a terminal; and
       transmitting the information about modulation and coding to the terminal, so that the terminal determines a spreading parameter according to the information about modulation and coding, wherein the spreading parameter is used for the terminal to spread symbols,
    wherein the information about modulation and coding includes index information for a modulation and coding scheme so that the terminal determines the spreading parameter for the terminal according to an index of the modulation and coding scheme and a first table, the first table including a plurality of indexes and spreading parameters corresponding to respective indexes, wherein the first table is determined by the following steps:
       determining a set of spectral efficiencies according to modulation parameters, coding parameters and candidate spreading parameters;
       selecting a predetermined number of spectral efficiencies from the set of spectral efficiencies;
       obtaining a plurality of spreading parameters included in the first table according to candidate spreading parameters corresponding to the predetermined number of spectral efficiencies to determine the first table.

* * * * *